June 23, 1936.  P. W. EHLE  2,045,009
APPARATUS FOR COOLING AND AERATING LIQUIDS
Filed Aug. 21, 1933  2 Sheets-Sheet 1
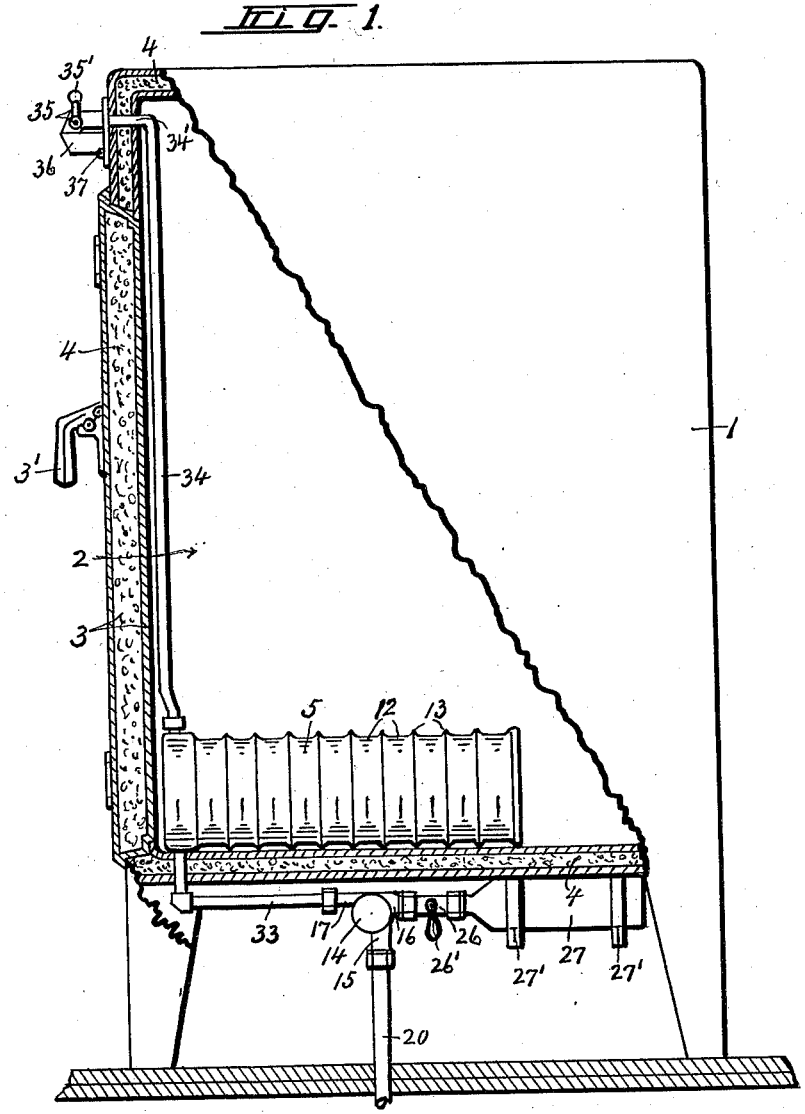

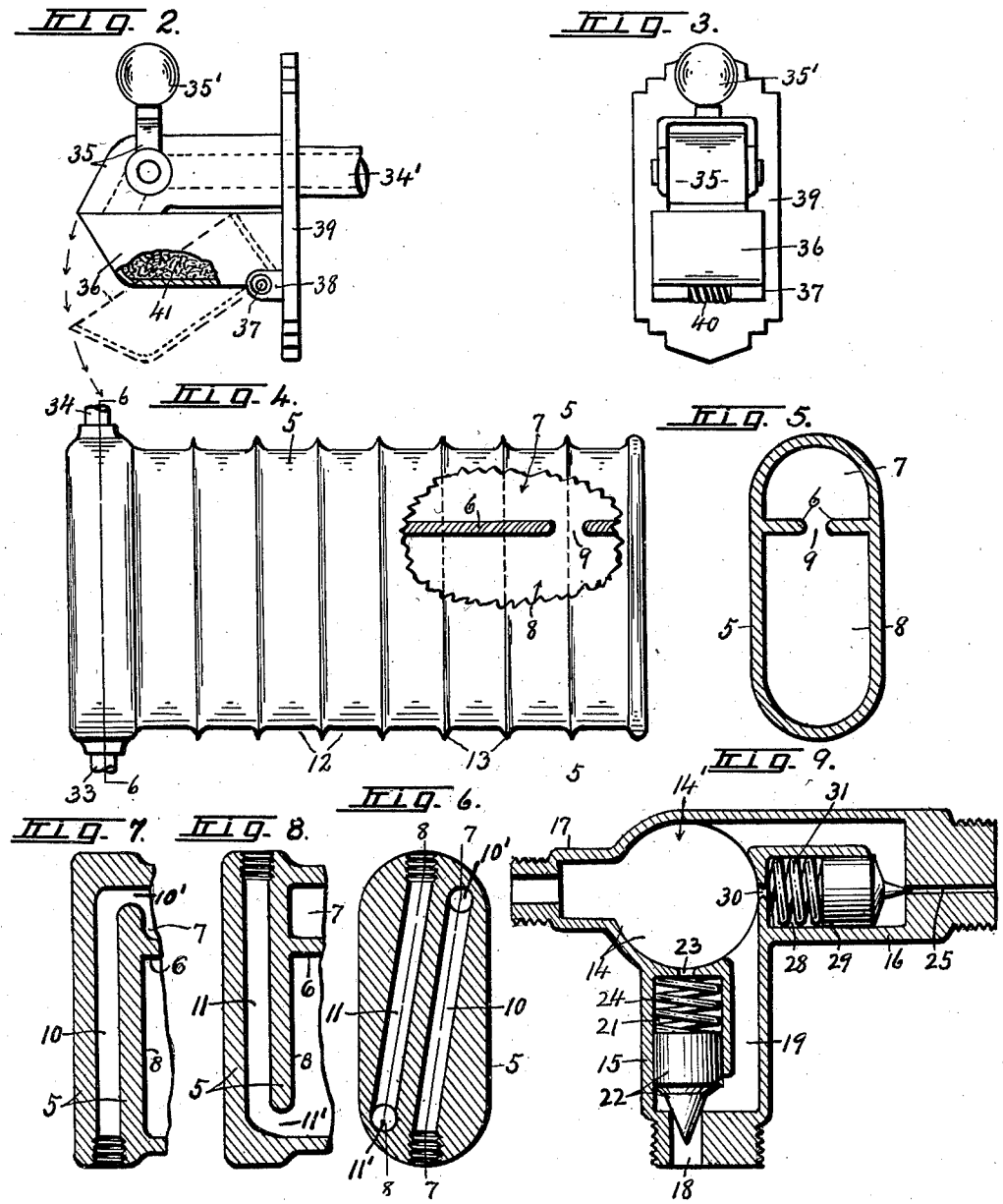

Patented June 23, 1936

2,045,009

UNITED STATES PATENT OFFICE 2,045,009

APPARATUS FOR COOLING AND AERATING LIQUIDS

Paul W. Ehle, Syracuse, N. Y.

Application August 21, 1933, Serial No. 686,178

9 Claims. (Cl. 225—1)

This invention relates to a method of and apparatus for cooling and aerating liquids such as plain drinking water, beverages and the like and involves the use of a cooling chamber and a liquid-receiving tank therein having upper and lower compartments connected through a relatively small passage near one end and having respectively suitable intake and exit passages for the liquid near the other end of the tank to assure a considerable reduction of the temperature of the liquid in the both compartments in transit through the tank preparatory to drawing off the same for use when desired.

The main object is to provide the usual type of house-refrigerator or other cooling chamber with a more convenient, economical and efficient means for supplying plain or aerated cold water or other liquid at the will of the user than has heretofore been practised.

One of the specific objects is to retain the liquid in elongated parallel compartments one above the other within the tank at all times, whether flowing therethrough or at rest, and thereby to effect a maximum cooling of the liquid in the lower compartment from which it is to be drawn as desired.

Another object is to enable the two fluid-supply conduits to be merged into a single mixing chamber so that both may be conducted into and through the compartments of the tank in sequence and then drawn off as desired through the delivery faucet.

A further object is to provide the mixing chamber with suitable check valves to prevent back pressure in the charging receptacle and liquid supply pipe and also to provide the connection between the charging receptacle and mixing chamber with a cut-off valve, operable at will, to control the flow of the charging fluid to said mixing chamber without retarding the flow of the liquid from the source of supply to the tank.

Another object is to provide an absorbent-containing drip pan hinged to the outer wall of the cooling chamber to swing to and from the nozzle of the faucet for receiving the drip therefrom.

Other objects and uses relating to specific parts of the apparatus will be brought out in the following description.

In the drawings:

Figure 1 is a side elevation, partly in section, showing the liquid and fluid-receiving tank and charging receptacle together with the liquid supply pipe and discharge pipe leading to the faucet.

Figure 2 is an enlarged side elevation of the detached faucet including the drip pan, the latter being shown by dotted lines in its depressed position.

Figure 3 is an outer face view of the parts shown in Figure 2.

Figure 4 is an enlarged side elevation, partly broken away and partly in section of the liquid and fluid-receiving tank.

Figure 5 is a transverse vertical sectional view taken on line 5—5, Figure 4.

Figure 6 is a transverse vertical sectional view taken in the plane of line 6—6, Figure 4, showing more particularly the arrangement of the inlet and outlet passages for the liquid and charging fluid.

Figures 7 and 8 are detail sectional views taken respectively on lines 7—7, and 8—8, Figure 6.

Figure 9 is an enlarged vertical sectional view of the mixing chamber showing more particularly the arrangement of the check valves for preventing back pressure to the charging receptacle and liquid supply pipe.

In order that the invention may be clearly understood, I have shown a house refrigerator 1 of any suitable construction having a cooling chamber 2 and a door 3, leading to the cooling chamber, the walls of the chamber 2 being provided with the usual heat insulating material 4 between the inner and outer linings of the refrigerator.

A liquid-receiving tank 5 is supported within the lower portion of the chamber 2, preferably on the bottom wall of the refrigerator, and is preferably elongated forwardly and rearwardly and oval in cross section, as shown more clearly in Figures 5 and 6, said tank being provided with a lengthwise horizontal partition 6 dividing the interior thereof into upper and lower lengthwise compartments 7 and 8.

This partition is preferably arranged nearer the upper than the lower walls of the tank so that the compartment 7 is considerably smaller than the compartment 8, said compartments being connected near one end by a relatively small passage 9 to allow the liquid to pass from the upper compartment to the lower compartment in the manner hereinafter described, see Figures 4 and 5.

The tank 5 is preferably made of non-corrodible cast metal such as aluminum or equivalent material and is provided near its front end with an inlet passage 10 and an outlet passage 11, the inlet passage extending upwardly from the lower face of the tank and having its upper end communicating with the upper compartment 7 through a branch passage 10', Figure 6, the outlet passage 11 being extended downwardly from the upper surface of the tank and having its lower end connected to the lower compartment through a branch passage 11', see Figures 6, 7 and 8.

The outer surface of the tank 5 is corrugated longitudinally, thus forming grooves 12 and ribs 13 alternating with each other as shown more clearly in Figures 1 and 4 for increasing the cooling area of the tank and also for reinforcing purposes.

A mixing device 14 is preferably arranged directly below the lower wall or bottom of the chamber 2 and is provided with a mixing chamber 14', a downwardly projecting vertical extension 15, and opposite end extensions 16 and 17, as shown more clearly in Figure 9.

The vertical extension 15 is provided in its lower side with a liquid inlet 18 communicating with the mixing chamber 14' through an upright passage 19 and is adapted to be connected to a source of water or other liquid supply by means of a supply pipe 20 for conducting the liquid to the mixing chamber 14' through the passage 19.

The extension 15 is also provided with an internal valve chamber 21 for receiving a vertically movable check valve 22 having a tapered lower end adapted to seat in the upper end of the liquid inlet passage 18.

The upper end of the valve chamber 21 is provided with a restricted passage 23 leading to the mixing chamber 14'. A coil spring 24 is arranged within the valve chamber between the upper end of the check valve 22 and top wall of the valve chamber for yieldingly holding the check valve 22 to its seat in the end of the inlet passage 18 and to permit the opening of the valve under pressure of the liquid through the inlet.

The rear end of the extension 16 is provided with a small fluid inlet passage 25 connected by a pipe 26 to a charging receptacle 27 containing a carbon-dioxide or other fluid under pressure to mix with the water or other liquid in the mixing chamber when desired, the connecting conduit 26 being provided with a valve 26' for controlling the passage of the charging fluid to said mixing chamber.

The rearwardly projecting extension 16 is also provided with a valve chamber 28 containing an axial movable check valve 29 having a rearwardly tapered extension adapted to seat in the inner end of the inlet passage 25. The inner wall of the valve chamber 28 is provided with a restricted passage 30 connecting said valve chamber with the mixing chamber 14'.

A coil spring 31 is interposed between the inner wall of the valve chamber 28 and inner end of the valve 29 for yieldingly holding the valve to its seat and also permitting the valve to open under pressure of the fluid from the charging receptacle 27. This charging receptacle is preferably secured in a horizontal position to the underside of the bottom wall of the cooling chamber 2 by means of clamping members 27, as shown in Figure 1, it being understood that the clamping members are releasable to permit the charging receptacle to be removed and replaced when desired.

The forwardly projecting extension 17 of the mixing device 14 is connected by means of a pipe 33 to the lower end of the inlet passage 10 leading to the upper compartment of the liquid-receiving tank for conducting water or other liquid from the mixing chamber 14' to the front end of the upper compartment.

A delivery pipe 34 is secured at its lower end to the upper end of the outlet passage 11 to extend upwardly therefrom preferably within the cooling chamber 2 to a plane some distance above the door 4, the upper end of the pipe 34 being offset forwardly at 34' through an opening in the front wall of the cooling chamber 2.

A faucet 35 is connected to the front end of the offset extension 34' at the outside of the front wall of the cooling chamber and is preferably secured thereto to avoid overstraining of the pipe 34 when operating the faucet which latter is provided with a suitable operating handle 35'.

A drip pan 36 is hinged at 37 to a suitable lug 38 on the faucet-supporting bracket 39 directly under the faucet 35 to swing vertically into and out of engagement with the mouth of the faucet as shown more clearly in Figure 2.

A coil spring 40 or its equivalent is connected to the hinged end of the drip pan 36 to yieldingly hold the latter in its closed position, said drip pan being arranged to contain a pad 41 of absorbent material to receive any drip from the faucet 35, see Figure 2. The front door 3 of the refrigerator as 1 may be provided with the usual handle 3' by which it may be opened and closed.

*Operation*

Any suitable means may be provided for maintaining the desired low temperature in the cooling chamber 2 of the refrigerator 1 and it will be noted that the liquid-receiving tank 5 and major portion of the delivery pipe 34 are located within the cooling chamber in such manner as to subject the liquid therein to about the temperature within said cooling chamber.

The compartments 7 and 8 of the tank are in constantly open communication with the source of liquid supply through the pipe 20 so that the flow of the liquid therethrough may be controlled entirely by the opening and closing of the faucet 35, as may be desired.

That is, when the valve 26' in the connection between the charging receptacle 27 and mixing device 14 is closed, the liquid supply such as water or other liquid passes from the pipe 20 into the inlet 18, opening the valve 22 through pressure of the liquid which then passes upwardly through the passage 19 into the mixing chamber and then outwardly through the extension 17 and passage 10 into the upper compartment 7 of the tank 5.

The liquid then flows from the upper compartment 7 into the lower compartment 8 through the passage 9 to return forwardly through the lower compartment into the passage 11 and thence upwardly through the delivery pipe 34 to the faucet 35 where the cooled liquid may be drawn off into a glass or other receptacle by simply depressing the drip pan 36 against the action of its spring 40 and then opening the faucet.

Under this arrangement, the temperature of the water or other liquid in both compartments will be lowered to about the temperature within the cooling chamber 2, but obviously the temperature of the liquid in the lower compartment will always be considerably lower than that in the upper compartment, particularly when the faucet 35 is open due to the retarded flow of the liquid from the upper compartment to the lower compartment through the restricted passage 9, thereby assuring a supply of cold liquid when the faucet 35 is opened.

When it is desired to charge the liquid flowing from the pipe 20 into the mixing chamber 14' with the gases under pressure in the receptacle 27, the valve 26' may be opened, thereby allowing the gas to flow through restricted passage 25, opening the valve 29 and allowing said gases to pass around the valve chamber 28 into the mixing chamber to mix with the inflowing liquid from the supply pipe 20, it being understood that when the faucet 35 is closed the back pressure in the mixing chamber will cause the check valves 22 and 29 to close aided by their respective springs 23' and 31, thus preventing the back flow of the liquid or gases to the supply pipe 20 and charging receptacle 27.

It is, of course, understood that when the valve 26' in the connection between the charging receptacle 27 and mixing chamber 14' is closed and the faucet 35 is opened, the liquid from the supply pipe 20 will flow through the mixing chamber and pipe 33 into the upper compartment and thence through the restricted passage 9 into the lower compartment and then outwardly through the delivery pipe 34 and open faucet 35 where it may be used for drinking purposes.

It is also evident that when the valve 26' is opened and the faucet 35 is also opened, the liquid from the pipe 20 and fluid from the charging receptacle 27 will both enter and mix within the mixing chamber 14 and then pass outwardly through the pipe 33 and passage 10 into the upper compartment and then into the lower compartment through the passage 9 to be delivered from the lower compartment through the pipe 34 to the open faucet 35 from which latter the cool charged liquid may be withdrawn into a suitable drinking glass or other receptacle.

The construction shown and described is particularly simple, practical and highly efficient, but obviously various changes may be made in certain details without departing from the spirit of the invention.

What I claim is:

1. In an apparatus for cooling and aerating liquids, in combination with a cooling chamber, of a liquid-receiving tank within said chamber having lower and upper compartments connected through a relatively small passage, said tank being provided with an inlet passage leading to one of the compartments and adapted to be connected to a source of liquid supply, and an outlet passage leading from the other compartment to the exterior of the cooling chamber, the inlet and outlet passages being arranged in offset relation near one and the same end of the tank.

2. In an apparatus for cooling and aerating liquids, the combination with a cooling chamber, of a liquid receiving tank within said chamber having lower and upper compartments connected through a relatively small passage, a charging receptacle containing a fluid under pressure, a mixing chamber connected to said receptacle and to the upper compartment, a supply pipe connected to said mixing chamber, a manually operated valve in the connection between the receptacle and mixing chamber, and an outlet faucet connected to the lower compartment.

3. A liquid cooling apparatus as in claim 2 in which the mixing chamber is provided with separate check valves for preventing back pressure therefrom to the receptacle and to the liquid supply pipe respectively.

4. In an apparatus for cooling and aerating liquids, the combination with a cooling chamber, of a liquid-receiving tank within said chamber having lower and upper compartments connected through a relatively small passage, means for supplying the liquid to one of the compartments, an outlet faucet connected to the other compartment, and a drip pan hinged to the outer wall of the cooling chamber to swing vertically directly under the faucet.

5. In an apparatus for cooling and aerating liquids, the combination with a cooling chamber, of a liquid-receiving tank within said chamber having lower and upper compartments connected through a relatively small passage, means for supplying the liquid to one of the compartments, an outlet faucet connected to the other compartment, and a drip pan hinged to the outer wall of the cooling chamber to swing vertically directly under the faucet and containing a liquid-absorbent material.

6. An apparatus for cooling liquids comprising in combination, a cooling chamber, an elongated liquid-receiving tank of oval cross-section arranged edgewise vertically within said chamber and provided with lengthwise lower and upper compartments and a relatively small connecting passage therefor, a mixing chamber having an outlet connected to the upper compartment, a discharge faucet connected to the lower compartment, a charging receptacle containing a fluid under pressure connected to the mixing chamber, a liquid supply pipe connected to said mixing chamber, a manually operated valve in the connection between said receptacle and mixing chamber, and separate check valves in the mixing chamber for preventing back pressure therefrom to the receptacle and supply pipe.

7. A liquid cooling apparatus comprising a tank adapted to be placed within a cooling chamber and provided with compartments arranged at different levels, one above the other, and connected near one end of the tank through a restricted passage, said tank being provided near its other end with a liquid inlet passage leading to one of the compartments, and a liquid-outlet passage leading from the other compartment, the inlet and outlet passages being arranged in offset relation.

8. In a liquid cooling apparatus, the combination with a tank adapted to be placed within a cooling chamber and having lower and upper compartments one above the other connected through a relatively small passage, of a mixing chamber having separate inlets, and an outlet common to both inlets in open communication with one of the compartments, one of the inlets being adapted to be connected to a source of liquid supply, a charging receptacle connected to the other inlet and containing a fluid under pressure, and check valves in said mixing chamber for preventing back flow of the liquid and fluid through their respective inlets.

9. In a liquid cooling apparatus, the combination with a tank adapted to be placed within a cooling chamber and having separate compartments connected with each other through a relatively small passage, of a mixing chamber having separate inlets and an outlet common to both inlets in open communication with one of the tank compartments, one of said inlets being adapted to be connected to a source of liquid supply, a charging receptacle connected to the other inlet and containing a fluid under pressure, check valves in said mixing chamber for preventing back flow of the liquid and fluid through their respective inlets, and a discharge faucet connected to the other tank compartment to control the flow of liquid and fluid through said mixing chamber and tank compartments.

PAUL W. EHLE.